United States Patent
Fukuo et al.

(10) Patent No.: US 9,683,118 B2
(45) Date of Patent: Jun. 20, 2017

(54) OIL-BASED PIGMENT INK COMPOSITION AND OIL-BASED PIGMENT INK WRITING TOOL

(71) Applicant: SAKURA COLOR PRODUCTS CORPORATION, Osaka-shi, Osaka (JP)

(72) Inventors: Hidetoshi Fukuo, Osaka (JP); Masamitsu Takahashi, Osaka (JP); Ryotaro Kaba, Osaka (JP)

(73) Assignee: SAKURA COLOR PRODUCTS CORPORATION, Osaka (JP)

( * ) Notice: Subject to any disclaimer, the term of this patent is extended or adjusted under 35 U.S.C. 154(b) by 58 days.

(21) Appl. No.: 14/786,504

(22) PCT Filed: Apr. 14, 2014

(86) PCT No.: PCT/JP2014/060568
§ 371 (c)(1),
(2) Date: Oct. 22, 2015

(87) PCT Pub. No.: WO2014/175086
PCT Pub. Date: Oct. 30, 2014

(65) Prior Publication Data
US 2016/0075893 A1 Mar. 17, 2016

(30) Foreign Application Priority Data
Apr. 25, 2013 (JP) ................. 2013-092985

(51) Int. Cl.
*C09D 11/17* (2014.01)
*B43K 8/02* (2006.01)
*B43K 8/03* (2006.01)

(52) U.S. Cl.
CPC ............... *C09D 11/17* (2013.01); *B43K 8/02* (2013.01); *B43K 8/022* (2013.01); *B43K 8/03* (2013.01)

(58) Field of Classification Search
CPC ......... C09D 11/16; C09D 11/17; C09D 11/18; C09D 11/20
USPC ........... 160/31.6, 31.65, 31.72, 31.85, 31.86, 160/31.9, 31.93
See application file for complete search history.

(56) References Cited

FOREIGN PATENT DOCUMENTS

| CN | 1534070 A | 10/2004 |
|---|---|---|
| JP | 61291664 A | 12/1986 |
| JP | 2000119579 A | 4/2000 |
| JP | 3122781 B | 10/2000 |
| JP | 2005139217 A | 6/2005 |
| JP | 2005298761 A | 10/2005 |
| JP | 200813588 A | 1/2008 |
| JP | 2013227369 A | 11/2013 |

OTHER PUBLICATIONS

A First Office Action issued by the State Intellectual Property Office of China, mailed Sep. 20, 2016, for Chinese counterpart application No. 201480023307.1.
International Search Report (ISR) mailed Jul. 15, 2014, issued for International application No. PCT/JP2014/060568.

*Primary Examiner* — David Walczak
*Assistant Examiner* — Joshua Wiljanen
(74) *Attorney, Agent, or Firm* — Law Office of Katsuhiro Arai

(57) ABSTRACT

An oil-based pigment ink composition contains titanium dioxide pigment, mica pigment, dispersant, oil-soluble resin, and organic solvent, whose viscosity at a shear velocity of 76 (l/s) is 50 mPa·s or lower. The ink composition produces writing with sufficient covering property and legibility, does not form hard cakes, and can release ink in a stable manner from the tip of a writing tool.

17 Claims, No Drawings

OIL-BASED PIGMENT INK COMPOSITION AND OIL-BASED PIGMENT INK WRITING TOOL

This application is the U.S. National Phase under 35 U.S.C. §371 of International Application PCT/JP2014/060568, filed Apr. 14, 2014, which claims priority to Japanese Patent Application No. 2013-092985, filed Apr. 25, 2013. The International Application was published under PCT Article 21(2) in a language other than English.

TECHNICAL FIELD

The present invention relates to an oil-based pigment ink composition of white color, and a writing implement using such composition.

BACKGROUND ART

Inks containing pearl pigment and titanium oxide and resin are known, such as those described in Patent Literatures 1 and 2; however, the inks described in these literatures are water-based inks.

In the meantime, while marker pens used to write on paper, etc., have been known for some time, paper comes in many different colors, although the predominant color is white, and depending on the color of paper the ink of the marker pen may not have sufficient covering property and cause writing to show the color of paper underneath, or the ink may bleed into the paper and writing may smudge and consequently fail to exhibit sufficient covering property. This tendency is particularly prominent when pigment of small grains is used.

White ink compositions for ball-point pens that contain water, shear-thinning agent, and pearl pigment of 2 to 40 μm in size, as coloring agent, constituted by mica grains whose surface is coated with titanium oxide are known, such as the one described in Patent Literature 3. However, these ink compositions are intended for ball-point pens and therefore are higher in viscosity than inks for marker pens, and also because ball-point pens release less ink from their tip, writing is produced with an insufficient amount of ink and thus is less legible.

Also, as described in Patent Literature 4, water-based pigment ink compositions that contain covering pigment grains of 20 μm or greater in median size as well as water-soluble adhesive resin are known, but these ink compositions are designed for use on paper, etc., to be scratched off later with a coin, etc., and they are not the so-called ink compositions for writing implements designed not to be scratched off.

BACKGROUND ART LITERATURE

Patent Literature

Patent Literature 1: Japanese Patent Laid-open No. Sho 61-291664
Patent Literature 2: Japanese Patent No. 3122781
Patent Literature 3: Japanese Patent Laid-open No. 2000-119579
Patent Literature 4: Japanese Patent Laid-open No. 2005-298761

SUMMARY OF THE INVENTION

Problems to be Solved by the Invention

When ink containing titanium dioxide and pearl pigment is used to write on paper, for example, the writing has excellent covering property and, if the viscosity of the ink is adjusted low, the ejecting property of the ink can also be improved; however, this ink is water-based and thus has high surface tension, which makes the ink less prone to bleeding into the paper but slow to dry.

Simply making the ink oil-based to improve these unwanted characteristics results in formation of a hard cake, causing the pigment to clog at the tip of the pen. If the viscosity is raised to prevent hard cakes, the fluidity becomes insufficient and makes it difficult to release from the pen tip the amount of ink needed to write, and consequently such ink composition is impractical.

An object of the present invention is to provide an oil-based ink composition containing titanium dioxide and pearl pigment, wherein such ink composition produces writing with sufficient covering property and legibility, does not form hard cakes, and can release ink in a stable manner from the tip of a writing implement.

Means for Solving the Problems

1. An oil-based pigment ink composition, containing titanium dioxide pigment, mica pigment, dispersant, oil-soluble resin, and organic solvent, whose viscosity at a shear velocity of 76 (1/s) is 50 mPa·s or lower.
2. An oil-based pigment ink composition according to 1, whose mica pigment has a cumulative grain size of 20 μm or less at 90% or more.
3. An oil-based pigment ink composition according to 1 or 2, containing fumed silica.
4. A marker pen, having an ink storage part in which the oil-based pigment ink composition according to any one of 1 to 3 is stored.
5. A marker pen according to 4, whose tip is constituted by fibers of 3 to 30 denier in yarn size.
6. A marker pen according to 4 or 5, which is a writing implement for use on paper or other liquid-absorbent surfaces.

Effects of the Invention

According to the present invention, an oil-based pigment ink composition can be provided which offers high covering property and produces writing that is clear and superbly legible, on paper or other material of high liquid absorbency or even on non-absorbent material, and which also offers good preservation stability and does not form hard cakes.

MODE FOR CARRYING OUT THE INVENTION

As for the functions of the oil-based pigment ink composition proposed by the present invention, the fact that it contains titanium dioxide pigment and mica pigment and exhibits a specific viscosity at a specific shear stress results in suppressed bleeding of these pigments into any dark-colored drawing paper or other paper, or black or other dark-colored (hereinafter simply referred to as "black" in some cases) writing target of high liquid absorbency, when the oil-based pigment ink composition is used to write on such paper, etc.

Also because the oil-based pigment ink composition contains titanium dioxide pigment with a cumulative grain size of 1 μm or less at 95%, and mica pigment with a cumulative grain size of 20 μm or less at 90% or more, bleeding of these pigments into such paper, etc., can be suppressed further. It should be noted that, when used in the context of the present invention, the term "cumulative grain size" pertaining to these pigments refers to the grain size at a cumulative volume of specific ratio when all grains are arranged cumulatively based on grain size from the smallest one.

As for the means for measuring the cumulative grain size, the Microtrac MT3000II (Nikkiso) was used as the measuring equipment, and measurement was performed using transmitting light by setting the refractive index of the grain to 1.81 and employing propylene glycol monomethyl ether as the solvent. The sample was dripped little by little into the solvent in the equipment and when the concentration reached the range for optimal measurement, "OK" appeared on the PC screen. This was followed by the pressing of the measurement button, upon which the solvent in which the sample was dispersed circulated within the cell in the equipment and the grain size was measured in the cell.

To be specific, the mica pigment in the oil-based pigment ink composition attached to black paper in a manner blocking the weave patterns of the black paper, and the titanium dioxide pigment deposited on top. This way, bleeding of the titanium dioxide pigment and mica pigment into the black paper was suppressed.

The writing produced on the black paper to which these pigments were attached as above will appear white due to the titanium dioxide pigment. However, it does not always appear white which is the inherent color of the titanium dioxide pigment; instead, depending on the mica pigment or other pigment it may assume a color that looks like a mixture of white from the titanium dioxide pigment and other color.

[Titanium Dioxide Pigment]

For the titanium dioxide blended into the ink composition proposed by the present invention, which is added for the purpose of improving the covering property of the oil-based pigment ink composition and also obtaining white ink, any standard titanium dioxide pigment used as white pigment is adopted.

The titanium dioxide pigment may be contained in the oil-based ink composition proposed by the present invention by 5.0 to 60.0 percent by weight or preferably by 10.0 to 40.0 percent by weight. The ink does not exhibit sufficient covering property if the titanium dioxide pigment is contained by less than 5.0 percent by weight, and does not flow out smoothly due to excessive viscosity if the titanium dioxide pigment is contained by over 60.0 percent by weight.

[Mica Pigment]

For the mica pigment, any pearl mica pigment produced by forming on the surface of mica powder one or more layers of titanium oxide, silicon oxide, aluminum oxide, iron oxide, etc., and thus adding pearl-like shine, etc., or any commonly used mica pigment, can be used. If pearl mica pigment is to be adopted, Iriodin 123 (manufactured by Merck) can be used.

In addition to mica pigment, talc, alumina, and kaolin can also be contained and used.

Under the present invention, such pigment is combined with titanium dioxide grains because, when an oil-based pigment ink composition is used on paper or other material, the flat pearl mica pigment and/or mica pigment would fill and thus cover the pores and gaps between fibers the material has. When titanium dioxide pigment is placed on top, the writing appears white and legible on such paper or other material.

Accordingly, the mica pigment used here does not have such dark color as to significantly impair the development of white color by the titanium dioxide pigment or the color development by any other coloring pigment that may be used, and additionally the mica pigment has a high content of grains of 20 µm or less in size, corresponding to around 90% or more or preferably 95% or more in cumulative grain size when these pigment grains are arranged cumulatively based on grain size from the smallest one.

If many mica pigment grains of over 20 µm in size are present in the oil-based pigment ink composition, the mica pigment clogs the tip of the writing implement easily, as is the case with the titanium dioxide pigment as mentioned earlier, and stable writing becomes more unlikely as a result. Also, such mica pigment may deposit/separate in the reservoir in which the ink is stored.

In addition, the average grain size of the mica pigment may be greater than that of the titanium dioxide pigment in order to prevent the titanium dioxide pigment from bleeding into the paper, etc.

It should be noted that any mica pigment having an iron oxide layer or other colored layer or mica pigment which is inherently colored may be used so long as it does not significantly impair the development of white color by titanium dioxide as mentioned above, even though the writing produced with such pigment will not appear white even when titanium dioxide pigment is combined, because the pigment itself has color.

For such mica pigment, Iriodin 123 or 111, or TM-10 manufactured by Yamaguchi Mica, may be used, for example.

As described above, for the mica pigment used under the present invention any commercially available mica pigment may be obtained and blended. If necessary, before use the pigment may be pulverized into smaller grains that are then classified to remove coarse grains of over 20 µm in size, and the remaining grains may be used.

Similar processing can be done for the titanium dioxide grains, where pulverizing or other processing may be performed as necessary to adjust the grain size until it falls in the ranges mentioned above.

[Ratio of Titanium Dioxide Pigment and Mica Pigment, and Content of Mica Pigment]

The ink composition proposed by the present invention contains the titanium dioxide pigment, and the pearl mica pigment and/or mica pigment at a weight ratio in a range of 9.9:0.1 to 5.0:5.0, or preferably at a weight ratio of 9.5:0.5 to 7:3. If the ratio of the titanium dioxide pigment is too high and deviates from these ranges of pigment ratios, the content of the pearl mica pigment/mica pigment which is added to control the bleeding of titanium oxide into paper or other material, becomes low and consequently the titanium dioxide pigment will likely bleed to the reverse side of the material, etc., reducing the covering property of the ink. If the ratio of the titanium dioxide pigment is too low, on the other hand, the quantity of the titanium dioxide pigment present in the writing decreases and therefore the writing is unlikely to appear white in color and the pearl mica pigment/mica pigment may become too glossy.

The content of the mica pigment is 1.0 to 20.0 percent by weight, or preferably 1.5 to 10.0 percent by weight.

The total content of the titanium dioxide pigment, and the pearl mica pigment and/or mica pigment is 6.0 to 61.0 percent by weight, or preferably 10.0 to 40.0 percent by weight, relative to the ink composition. A total content of over 61.0 percent by weight or mica pigment content of over 20.0 percent by weight causes the ink composition to become too viscous and the ink flows out less smoothly, while a total content of less than 6.0 percent by weight or mica pigment content of less than 1.0 percent by weight leads to poor color development of the ink composition and consequently reduced covering property.

[Oil-Soluble Resin]

For the oil-soluble resin used under the present invention, ketone resin, xylene resin, polyamide resin, rhodine ester, hydrogenated rhodine ester, acrylic resin, terpene phenol, alkyl phenol resin, maleic acid resin, petroleum resin, vinyl resin, cellulose resin, or any other oil-soluble resin that can be used for writing implements is adopted.

The resin in the oil-based pigment ink composition proposed by the present invention is contained by 1.0 to 40.0 percent by weight, or preferably 3.0 to 30.0 percent by weight, in solid contents. If the concentration in solid contents exceeds 40.0 percent by weight, the oil-based pigment ink composition may become too viscous and cause the ink to flow out less smoothly. If the concentration in solid contents is less than 1.0 percent by weight, on the other hand, the adhesion property may drop and the writing produced with the oil-based pigment ink composition may not adhere to the surface of the target with enough strength.

[Fumed Silica]

The oil-based pigment ink composition proposed by the present invention contains fumed silica. Either hydrophobic or hydrophilic fumed silica may be used, but hydrophobic fumed silica is preferred.

The fumed silica in the oil-based pigment ink composition proposed by the present invention is contained by 0.01 to 10.0 percent by weight, or preferably 0.1 to 3.0 percent by weight. A content of over 10.0 percent by weight causes the oil-based pigment ink composition to become too viscous and the oil-based pigment ink flows out less smoothly, while a content of less than 0.01 percent by weight causes the viscosity to become too low and leads to formation of hard cakes during storage as well as poor color development and legibility of the ink on non-absorbent surfaces.

[Dispersant]

The ink composition proposed by the present invention is an oil-based ink that contains dispersant to improve the dispersibility of pigments. For this dispersant, any polyester, polyurethane, polyamino, acrylic, styrene-acrylic, styrene-maleic acid copolymer, or other polymeric dispersant can be used favorably, but the selection is not limited to the foregoing.

Such dispersant is contained in the oil-based pigment ink composition by 0.05 to 10.0 percent by weight, or preferably 0.1 to 5.0 percent by weight. The resin used here offers excellent solubility in the solvent as well as the effect of stabilizing the dispersed pigments and thus preventing them from depositing, while at the same time it also functions as a vehicle for forming a coating film of the oil-based pigment ink composition. If the content of the dispersant exceeds 10.0 percent by weight, drop in the drying speed of the coating film, drop in the adhesion property, and deterioration in the water resistance are concerning. If the content is less than 0.05 percent by weight, on the other hand, agglutination of pigments reduces the stability of the oil-based pigment ink composition.

[Viscosity]

The ink composition proposed by the present invention exhibits amply strong thixotropic property at temperatures of 20.0±0.3° C.

To be specific, its viscosity is 40 mPa-s or higher, or preferably 80 mPa-s or higher, or more preferably 300 mPa-s or higher, at a shear velocity of 1 (l/s). By adjusting the viscosity to these ranges, pigment deposition and resulting generation of hard cakes can be prevented.

In addition, its viscosity is 50 mPa-s or lower, or preferably 40 mPa-s or lower, or more preferably 30 mPa-s or lower, or even more preferably 25 mPa-s or lower, at a shear velocity of 76 (l/s). By adjusting the viscosity to these ranges, the ink can be released smoothly from the writing implement. Also, preferably the lower limit of viscosity is 5 mPa-s.

When a marker pen with an ink storage part in which the oil-based pigment ink composition is stored is used, for example, such thixotropic property allows for reliable writing because of the shearing force at the tip pertaining to the oil-based pigment ink composition, while it also allows an appropriate amount of ink to be supplied to the tip from the storage part.

[Solvent]

With the oil-based pigment ink composition proposed by the present invention, any known organic solvent can be used for the solvent so long as it can achieve the resin solubility and drying property of coating film as mentioned above. For example, hydrocarbon solvent such as aliphatic hydrocarbon solvent, alicyclic hydrocarbon solvent, aromatic hydrocarbon solvent, halogenated hydrocarbon solvent, or the like can be used; also, alcohol solvent such as methyl alcohol, ethyl alcohol, propyl alcohol or the like; glycol solvent such as ethylene glycol, propylene glycol, diethylene glycol, or the like; glycol ether solvent such as ethyl ether, propyl ether, butyl ether, phenyl ether or other the like of dipropylene glycol, propylene glycol, and propylene glycol; or methyl ether acetate or methyl ether acetate ester solvent, can be used, for example.

With the oil-based pigment ink composition proposed by the present invention, the content of the solvent is not limited in any way, but normally it is in a range of 40.0 to 80.0 percent by weight, or preferably 50.0 to 70.0 percent by weight, with respect to the ink composition. If the content exceeds 80.0 percent by weight, the viscosity drops and the ink flows out excessively to cause smudges. If the content is less than 40.0 percent by weight, on the other hand, the viscosity becomes too high and the ink flows out less smoothly.

Furthermore, thixotropic agent, UV absorbent, coloring agent such as pigment and dye, fluorescent whitening agent, leveling agent, and other known additives can also be contained as deemed appropriate. For coloring agent of non-white color, either inorganic pigment or organic pigment can be contained. If any such coloring agent is to be contained, it is blended so that the content in the oil-based pigment ink composition becomes 0.01 to 20 percent by weight, or preferably 0.1 to 15 percent by weight.

By blending these components by the specified quantities and then mixing and agitating them uniformly using a ball mill, homogenizing mixer, bead mill, roll mill, or any other known conventional dispersing machine, the oil-based pigment ink composition proposed by the present invention can be prepared.

[Applications of Oil-Based Pigment Ink Composition and Marker Pen]

The oil-based pigment ink composition proposed by the present invention is primarily used for marker pens. It can also be used for marker pens to write on paper, porous material, or other liquid-absorbent surface. Any marker pen used for such purpose can have any known structure, with its tip made of bundled fibers or plastics and its shaft housing an oil-based pigment ink composition storage part, where the oil-based pigment ink composition storage part can also store a spherical piece inside, which is made of stainless steel, etc., and is used for agitating the ink composition as the marker pen, etc., is shaken.

The oil-based pigment ink composition storage part is preferably connected to an ink supply channel via a valve body so that the ink composition is supplied to the tip of the marker pen, etc., through the ink supply channel.

The tip is formed as a communicating porous member not only when it is constituted by bundled fibers but also when it is constituted by plastics. Especially when the tip is constituted by bundled fibers, desirably the yarn size of the fibers is 3 to 30 denier, but adjusting it to 5 to 25 denier in particular is preferred in order to allow the oil-based pigment ink composition to be supplied to the tip in a stable manner.

The oil-based pigment ink composition proposed by the present invention has certain properties in terms of the size of pigment grains and viscosity and therefore the titanium oxide pigment and pearl mica pigment and/or mica pigment constituting the ink composition can be used on paper, fabric, or any non-absorbent surface such as resin or metal.

It should be noted that, although the oil-based pigment ink composition or marker pen proposed by the present invention is assumed to be used on paper of black or other dark color, it can also be used on paper of any other color so long as the color of the oil-based pigment ink composition proposed by the present invention is amply legible in the writing produced with it.

[Manufacturing Methods for Oil-Based Pigment Ink Composition]

Described below are two examples of how the oil-based pigment ink composition proposed by the present invention may be manufactured; however, the manufacturing method is not limited to these two examples.

(Manufacturing Method 1)

Solvent, dispersant, fumed silica, titanium dioxide pigment, and mica pigment are mixed and agitated in a pigment dispersion container to pulverize the pigments and disperse them until the grain sizes of the pigments reach the target grain sizes, to manufacture white pigment dispersion liquid or colored pigment dispersion liquid.

Next, solvent, resin, and coloring agent if necessary, are added and the liquid is mixed. Next, thixotropic agent is added, if necessary, and the liquid is further mixed uniformly and adjusted until the viscosity falls in the desired range.

(Manufacturing Method 2)

Solvent, dispersant, and titanium dioxide pigment are mixed and agitated in a pigment dispersion container to pulverize the titanium dioxide pigment and disperse it until the grain size of the titanium dioxide pigment reaches the target grain size, to manufacture titanium dioxide pigment dispersion liquid.

In a separately prepared pigment dispersion container, solvent, resin, mica pigment, and fumed silica are mixed and agitated to pulverize the mica pigment and disperse it until the grain size of the mica pigment reaches the target grain size, to manufacture mica pigment dispersion liquid.

Next, the manufactured titanium dioxide pigment dispersion liquid and mica pigment dispersion liquid are mixed to the target concentration, to manufacture pigment dispersion liquid.

Thereafter, solvent is added, along with coloring agent if necessary, and the liquid is mixed. Next, thixotropic agent is added, if necessary, and the liquid is further mixed uniformly and adjusted until the viscosity falls in the desired range.

EXAMPLES AND COMPARATIVE EXAMPLES

Manufacture of Oil-Based Pigment Ink

In a pigment dispersion container, solvent and dispersion resin were introduced and agitated until the percentage by weight of each component of the oil-based ink reached the blending content shown in Table 1 below. Pigment was mixed into the obtained dispersion resin solution and the liquid was agitated to disperse the pigment, to obtain pigment dispersion.

In a separate container, solvent and fumed silica were introduced and the agitated mixture was passed twice through three rollers and kneaded.

The pigment dispersion thus obtained and solvent were introduced to an ink manufacturing container and resin was introduced to the mixture under agitation, after which various additives were introduced further, and then the fumed silica dispersion obtained above was introduced under agitation, to obtain oil-based pigment ink.

Then, each oil-based pigment ink was measured for viscosity, covering property, hard cake property and legibility according to the measurement methods described below.

Preparation of Test Samples

The manufactured oil-based pigment ink composition was filled in the aluminum container inside the body of the pen housing a steel-ball agitator, where both ends of the cylindrical container were sealed by polypropylene caps, after which the container was closed using the polypropylene valve and then the tip formed by bundled fibers was attached downstream of the valve.

[Measuring Methods]

Measuring method for viscosity (at shear velocity of 76 (1/s))

The Rheo Stress 6000 was used as a viscosity-measuring equipment. Using co-axial double cylinders DG41 as a jig, viscosity was measured at a temperature of 20.0±0.3° C. at a shear velocity of 76 (1/s).

Checking Method for Drawn Line

A line was drawn on black drawing paper and the covering property of the line with respect to the black drawing paper was visually checked.

Evaluation ○: The drawn line has good covering property.

Δ: The drawn line has some covering property.

X: The drawn line has poor covering property.

Checking Method for Cake Generation

The ink was put in a bottle and kept at 50° C. for two weeks, and then re-agitation property after storage was visually checked.

Evaluation ○: The ink could be agitated again with ease. Extremely soft cakes generated.

Δ: The ink could be agitated again, although not with ease. Soft cakes generated.

X: Hard cakes generated.

Checking Method for Legibility

Legibility of a line drawn on black art paper (non-absorbent surface) was visually checked.

Evaluation ○: The drawn line had good legibility.

Δ: The drawn line had some legibility.

X: The drawn line had poor legibility.

TABLE 1

| | Examples Effect of Covering Property of Pearl Pigment | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Tipaque CR95 | | | | | | 31.5 | 31.5 | 31.5 | 31.5 | 31.5 | 31.5 | 31.5 | 37.8 | 37.8 | 37.8 | 37.8 |
| R-25 | 31.5 | 31.5 | 31.5 | 31.5 | 31.5 | | | | | | | | | | | |
| Lionol Green YS-07 | | | | | | | | | | | | | | | | |
| Iriodin 123 Bright | 3.5 | | | 3.5 | | 3.5 | | 3.5 | | | | | | | | |
| Serath YFA02050 | | 3.5 | | | | | | | | | | | | | | |
| TM-10 | | | 3.5 | | 3.5 | | 3.5 | | 3.5 | 3.5 | 3.5 | 3.5 | 4.2 | 4.2 | 4.2 | 4.2 |
| Solsperse 41000 | 0.9 | 0.9 | 0.9 | | | 0.8 | 0.8 | | | | | | | | | |
| DISPREBYK110 | | | | 0.9 | 0.9 | | | 0.9 | 0.9 | | | | | | | |
| DISPREBYK185 | | | | | | | | | | | | | | | | |
| Solsperse 71000 | | | | | | | | | | 0.8 | 0.6 | 0.4 | 0.5 | | | |
| Solsperse 76500 | | | | | | | | | | | | | | | | |
| Solsperse J200 | | | | | | | | | | | | | | 1.5 | 1.5 | 1.5 |
| Solsperse 32500 | | | | | | | | | | | | | | | | |
| Solsperse 12000 | | | | | | | | | | | | | | | | |
| BYK430 | | | | | | | | | | | | | | | 0.2 | |
| BYK431 | | | | | | | | | | | | | | | | 0.3 |
| Reolosil HM-20L | | | | | | | | | | | | | | | | |
| Hilac 111 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Tego Variplus AP | | | | | | | | | | | | | | | | |
| Dowanol PM | 59.1 | 59.1 | 59.1 | 59.1 | 59.1 | 59.2 | 59.2 | 59.1 | 59.1 | 59.2 | 59.4 | 59.6 | 52.5 | 51.5 | 51.3 | 51.2 |
| Dowanol DPM | | | | | | | | | | | | | | | | |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Viscosity | — | — | — | — | — | — | — | — | — | — | 6.4 | 6.5 | 10.3 | 10.9 | 20.6 | 20.0 |
| Covering Property | ○ | ○ | ○ | ○ | ○ | ○ | ○ | ○ | ○ | ○ | ○ | ○ | ○ | ○ | ○ | ○ |
| Cake Generation | Δ | Δ | Δ | Δ | Δ | Δ | Δ | Δ | Δ | Δ | Δ | Δ | Δ | Δ | Δ | Δ |
| Legibility | ○ | ○ | ○ | ○ | ○ | ○ | ○ | ○ | ○ | ○ | ○ | ○ | ○ | ○ | ○ | ○ |

| | Comparative Examples | | | | | | | | | | | | | |
|---|---|---|---|---|---|---|---|---|---|---|---|---|---|---|
| | Examples Effects of Legibility and Storage Stability | | | Comparative Examples for Covering Property | | | | | | | | | | Comparative Examples for Legibility and Storage Stability |
| | 17 | 18 | 19 | 1 | 2 | 3 | 4 | 5 | 6 | 7 | 8 | 9 | 10 | 11 |
| Tipaque CR95 | 16.2 | 16.2 | 16.2 | | | 35.0 | 35.0 | 42.0 | 42.0 | 42.0 | 42.0 | 42.0 | 42.0 | 16.2 |
| R-25 | | | | 35.0 | 35.0 | | | | | | | | | |
| Lionol Green YS-07 | 2.7 | 2.7 | 2.7 | | | | | | | | | | | 2.7 |
| Iriodin 123 Bright | | | | | | | | | | | | | | |
| Serath YFA02050 | | | | | | | | | | | | | | |
| TM-10 | 1.8 | 1.8 | 1.8 | | | | | | | | | | | 1.8 |
| Solsperse 41000 | | | | 1.1 | | 0.9 | | | | | | | | |
| DISPREBYK110 | | | | | 1.1 | | 1.1 | | | | | | | |
| DISPREBYK185 | | | | | | | | | | | | | | |
| Solsperse 72000 | | | | | | | | 1.1 | 1.6 | | | | | 0.2 |
| Solsperse 76500 | 0.2 | 0.2 | 0.2 | | | | | | | | | | | |
| Solsperse J200 | | | | | | | | | | 1.1 | 1.6 | 1.6 | 1.6 | |
| Solsperse 32500 | 1.1 | 1.1 | 1.1 | | | | | | | | | | | 1.1 |
| Solsperse 12000 | 0.1 | 0.1 | 0.1 | | | | | | | | | | | 0.1 |
| BYK430 | | | | | | | | | | | 0.2 | | | |
| BYK431 | | | | | | | | | | | | 0.3 | | |
| Reolosil HM-20L | 0.2 | 0.8 | 1.5 | | | | | | | | | | | |
| Hilac 111 | | | | 5.0 | 5.0 | 5.0 | 5.0 | 5.0 | 5.0 | 5.0 | 5.0 | 5.0 | 5.0 | |
| Tego Variplus AP | 5.0 | 5.0 | 5.0 | | | | | | | | | | | 5.0 |
| Dowanol PM | 71.9 | 67.9 | 62.9 | 58.9 | 58.9 | 59.9 | 58.9 | 51.9 | 51.4 | 51.9 | 51.4 | 51.2 | 51.1 | 72.9 |
| Dowanol DPM | 0.9 | 4.3 | 8.5 | | | | | | | | | | | |
| Total | 100.1 | 100.1 | 100.0 | 100.0 | 100.0 | 100.0 | 100.0 | 100.0 | 100.0 | 100.0 | 100.0 | 100.0 | 100.0 | 100.0 |
| Viscosity | 6.7 | 7.8 | 9.2 | — | — | — | — | — | — | — | 13.0 | 20.7 | 16.2 | 6.5 |
| Covering Property | ○ | ○ | ○ | X | X | X | X | X | X | X | X | X | X | ○ |

TABLE 1-continued

| Cake Generation | ○ | ○ | ○ | X | X | X | X | X | X | X | X | X | X | X |
| Legibility | Δ | Δ | ○ | ○ | ○ | ○ | ○ | ○ | ○ | ○ | ○ | ○ | ○ | X |

Tipaque CR95—Titanium oxide (Ishihara Sangyo)
Titone R-25—Titanium oxide (Sakai Chemical)
Lionol Green YS-07—Organic pigment (Toyo Ink)
Iriodin 123 Bright—Pearl mica pigment
Serath YFA02050—Aluminum oxide (Kinsei Matec)
TM-10—Mica pigment (Yamaguchi Mica)
Solsperse 41000—Dispersant (Lubrizol)
Solsperse 76500—Dispersant (Lubrizol)
Solsperse J200—Dispersant (Lubrizol)
Solsperse 32500—Dispersant (Lubrizol)
Solsperse 12000—Dispersant (Lubrizol)
BYK430—Thixotropic agent (BYK Japan)
BYK431—Thixotropic agent (BYK Japan)
Reolosil HM-20L—Fumed silica (Tokuyama)
Hilac 111—Ketone resin (Hitachi Chemical)
Tego Variplus AP—Ketone resin (Impex Chemicals)
Dowanol PM—Propylene glycol monomethyl ether (solvent) (Dow Chemical)
Dowanol DPM—Dipropylene glycol monomethyl ether (solvent) (Dow Chemical)

According to Examples 1 to 16 above, where titanium dioxide pigment and mica pigment were contained, oil-based pigment ink compositions producing writing with excellent covering property could be obtained, although soft cakes generated. Soft cakes generated only to the extent that they could be dispersed again with ease when agitated again.

According to Examples 17 to 19, where the oil-based pigment ink compositions contained fumed silica, extremely soft cakes generated but only to the extent that they could be dispersed again with ease when agitated again a little.

On the other hand, the results of Comparative Examples 1 to 10 representing oil-based pigment ink compositions not containing titanium dioxide pigment or mica pigment or fumed silica show that, although the writing had good legibility, their covering property was poor and also hard cakes that were difficult to be dispersed again generated, while Comparative Example 11 resulted in both generation of hard cakes and poor legibility. In essence, these writing implements led to generation of cakes that were difficult to be dispersed again, and could not produce fully satisfactory writing due to less-than-desirable legibility or covering property.

What is claimed is:

1. An oil-based pigment ink composition, containing titanium dioxide pigment, mica pigment, dispersant, oil-soluble resin, and organic solvent, whose viscosity at a shear velocity of 76 (l/s) is 50 mPa-s or lower.

2. An oil-based pigment ink composition according to claim 1, whose mica pigment has a cumulative grain size of 20 μm or less at 90% or more.

3. An oil-based pigment ink composition according to claim 2, containing fumed silica.

4. An oil-based pigment ink composition according to claim 1, containing fumed silica.

5. A marker pen, having an ink storage part in which the oil-based pigment ink composition according to claim 1 is stored.

6. A marker pen according to claim 5, whose tip is constituted by fibers of 3 to 30 denier in yarn size.

7. A marker pen according to claim 5, which is a writing implement for use on paper or other liquid-absorbent surface.

8. A marker pen according to claim 6, which is a writing implement for use on paper or other liquid-absorbent surface.

9. A marker pen, having an ink storage part in which the oil-based pigment ink composition according to claim 2 is stored.

10. A marker pen according to claim 9, whose tip is constituted by fibers of 3 to 30 denier in yarn size.

11. A marker pen according to claim 10, which is a writing implement for use on paper or other liquid-absorbent surface.

12. A marker pen, having an ink storage part in which the oil-based pigment ink composition according to claim 4 is stored.

13. A marker pen according to claim 12, whose tip is constituted by fibers of 3 to 30 denier in yarn size.

14. A marker pen according to claim 13, which is a writing implement for use on paper or other liquid-absorbent surface.

15. A marker pen, having an ink storage part in which the oil-based pigment ink composition according to claim 3 is stored.

16. A marker pen according to claim 15, whose tip is constituted by fibers of 3 to 30 denier in yarn size.

17. A marker pen according to claim 16, which is a writing implement for use on paper or other liquid-absorbent surface.

* * * * *